United States Patent [19]
Aungst

[11] 3,961,198
[45] June 1, 1976

[54] VISUALLY ALIGNABLE SENSOR WAND WHICH EXCLUDES UNWANTED LIGHT FROM A SENSOR SYSTEM

[75] Inventor: Jack D. Aungst, Corona, Calif.

[73] Assignee: Rockwell International Corporation, El Segundo, Calif.

[22] Filed: Apr. 28, 1975

[21] Appl. No.: 572,679

[52] U.S. Cl. .............................. 250/566; 250/239; 250/216; 356/219
[51] Int. Cl.² ......................................... G06H 7/10
[58] Field of Search ............ 250/239, 228, 566–570, 250/555, 557, 226, 578; 356/219, 237, 238; 235/61.11 E

[56] References Cited
UNITED STATES PATENTS

| | | | |
|---|---|---|---|
| 3,091,694 | 5/1963 | Goodridge | 250/239 X |
| 3,214,596 | 10/1965 | Schwerdt, Jr. et al. | 250/239 |
| 3,360,656 | 12/1967 | Kinnard | 250/239 X |
| 3,365,572 | 1/1968 | Strauss | 250/222 R |
| 3,512,130 | 5/1970 | Hulett | 250/555 X |
| 3,777,170 | 12/1973 | Hoffmann | 250/570 |
| 3,812,347 | 5/1974 | Cunningham et al. | 235/61.11 X E |

*Primary Examiner*—Walter Stolwein
*Attorney, Agent, or Firm*—H. Fredrick Hamann; G. Donald Weber, Jr.; Robert Ochis

[57] ABSTRACT

An optical sensor wand is disclosed which is designed to be optically aligned by an operator through use of visible light but which excludes the visible light utilized for alignment from the sensing optical channel whereby the sensing optical system operates in the "dark".

10 Claims, 4 Drawing Figures

VISUALLY ALIGNABLE SENSOR WAND WHICH EXCLUDES UNWANTED LIGHT FROM A SENSOR SYSTEM

BACKGROUND OF THE INVENTION

1. Field of the Invention

The invention relates to the field of data collection wands which must be aligned with the data to be collected and more particularly to such wands which are aligned visually and which optically sense the data to be collected.

2. Prior Art

Prior art data collection wands utilize alignment systems which either restrict the format of the data to be viewed or partially obstruct the operator's view of the data during alignment. Such systems are lacking in versatility or are fatiguing for an operator to utilize.

SUMMARY OF THE INVENTION

The above problems are overcome through use of a data collection wand which may be visually aligned with data by an operator sighting through a wand alignment optical channel within the wand. The alignment channel has a field of view which encompasses the data collection field of view. The commonality of the data collection and alignment fields of view minimize (1) obstruction of the operator's view and (2) data-format limitations imposed by the optical system.

Data collection is achieved using a data sensing wavelength of light which is not utilized for visual alignment of the wand. Interference in the data collection system by the light utilized for alignment is eliminated by excluding light of the data-sensing-wavelength from the portion of the alignment optical channel which is common to the data collection optical channel and by preventing alignment light of a wavelength to which the photosensor would respond from reaching the photosensor.

DETAILED DESCRIPTION OF THE PREFERRED EMBODIMENT

Figure 1:
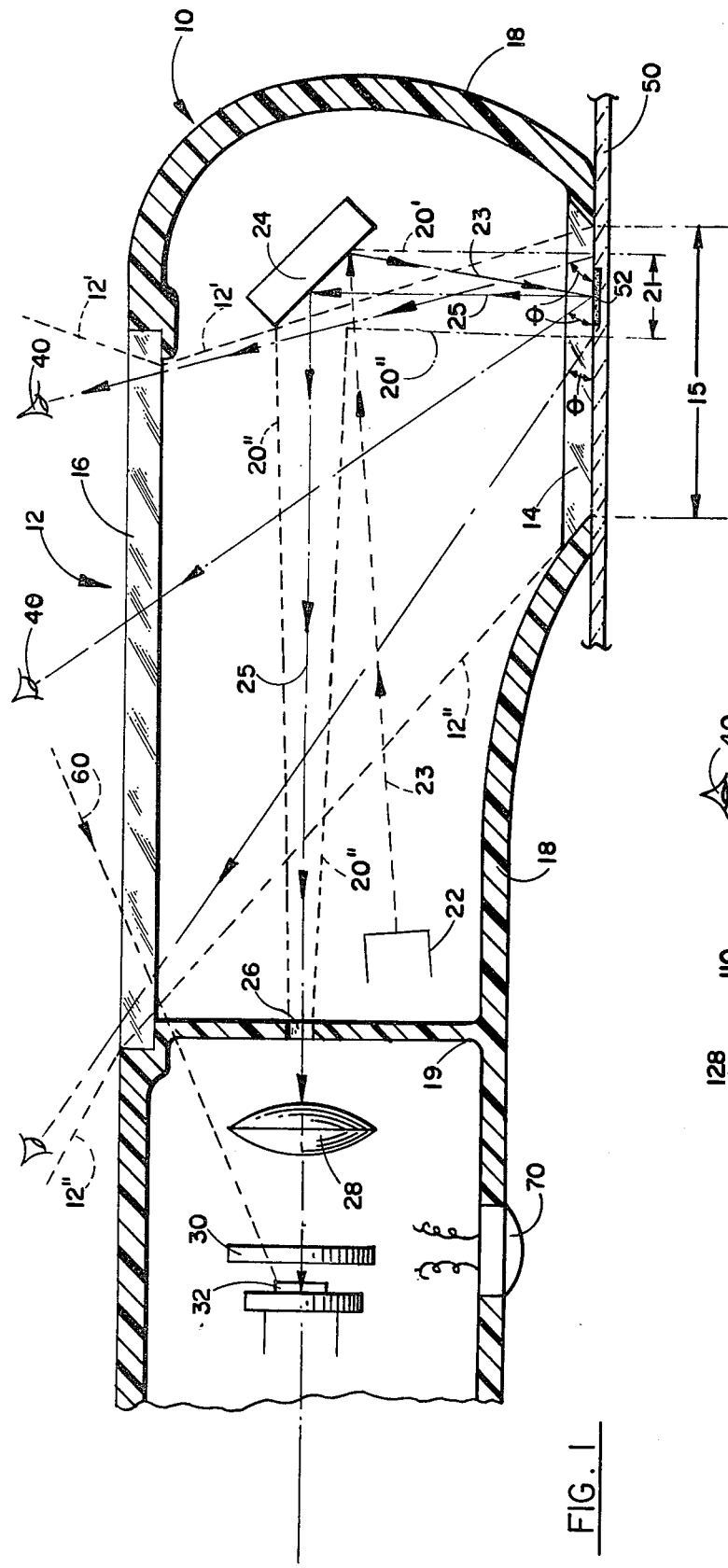
FIG. 1 is a schematic cross-sectional diagram illustrating one embodiment of the invention.

A data collection wand in accordance with the invention is illustrated generally at 10 in FIG. 1. A wand visual-alignment optical channel 12, indicated by boundary lines 12' and 12'', is provided for operator use in visually aligning the data collection wand 10 with data 52 to be collected or sensed. Visual alignment optical channel 12 has a field of view 15 which encompasses the data to be collected 52. Visual alignment channel 12 includes a lower or objective window 14 which is designed to be placed in proximity to the data to be collected. If desired, reticle lines may be provided on window 14 to aid in alignment of the wand with data 52. Visual alignment channel 12 further includes an upper or viewing window 16 through which an operator 40 may observe the objective window and the data thereunder. Windows 14 and 16 are supported by a housing 18 which is preferably opaque to light of the wavelength utilized to sense data. The upper and lower windows together serve to prevent an accumulation of dust within the optical system of the data collection wand. If dust accumulation is not a problem and reticle lines are not needed, objective window 14 may be omitted.

A data collection or data sensing optical channel 20 indicated by boundary lines 20' and 20'' has a field of view 21 which encompasses the data 52 to be collected. Data sensing field of view 21 is preferably completely encompassed by the visual alignment field of view 15. It is desirable to have the alignment field of view 15 substantially larger than the data sensing field of view 21 in order to provide an operator or a server with an unobstructed view through visual alignment channel 12 of the data to be sensed 52 over a substantial range of viewing angles. A source 22 of data-sensing radiation 23 provides radiation to illuminate the data 52 to be collected by wand 10. As illustrated in FIG. 1, the data-sensing radiation 23 from source 22 may be reflected toward the data by mirror 24. Alternatively, the source 22 may be positioned to illuminate the data directly. With either positioning of source 22, the data sensing radiation 23 passes through objective window 14, strikes the data to be collected and is reflected back toward mirror 24 as return or data radiation 25. Mirror 24 reflects the data radiation 25 into an aperture stop 26 of data collection optical channel 20. Data radiation 25 passes through a lens system 28 which focuses the data radiation on a photosensor 32. If desired a filter 30 may be placed in the optical path of radiation striking photosensor 32 in order to limit the range of wavelengths which can reach the photosensor.

It is preferred to have lens system 28, and photosensor 32 enclosed within a housing 19 which is opaque to radiation to which photosensor 32 is responsive. Aperture stop 26 is preferably the only opening in the opaque housing 19 which will admit radiation into the housing. In this way, the housing 19 blocks stray radiation 60 which might otherwise impinge on photosensor 32 and reduce the contrast of the image of the data being collected.

A switch or other control means 70 is preferably provided on wand 10 to enable an operator to control when data is sensed.

The complexity required of photosensor 32 may be minimized if the data to be sensed 52 is illuminated with data-sensing wavelength radiation (1) of a predetermined intensity and (2) only when it is desired to record data. The data to be sensed 52 will be illuminated by data-sensing wavelength radiation of known intensity if it is illuminated only by a source of data-sensing wavelength radiation which is contained within wand 10 and has a known intensity. This can be achieved, if data-sensing wavelength radiation which originates outside of the wand is prevented from illuminating the data to be sensed 52. The data to be sensed 52 will be illuminated by data-sensing radiation only when it is desired to record data if (1) radiation of the data-sensing wavelength originating outside the wand is prevented from illuminating the data to be sensed 52 and (2) data-sensing radiation source 22 is (a) operated in a pulse mode and (b) activated only when data is to be reported. Where source 22 is operated in a pulse mode, activation of source 22 is controlled by switch 70.

In order to provide an image of known intensity and of good contrast and to obtain the benefits of operating photosensor 32 in a manner in which it is illuminated by an image only during the duration of a pulse from source 22, radiation of the data-sensing-wavelength must be excluded from entering (via the visual alignment channel) at least that portion of the visual alignment channel 12 which is common to data sensing channel 20. This prevents data-sensing-wavelength radiation which would otherwise enter the wand through the visual alignment channel from introducing wide variations in the intensity of the data image on photosensor 32 and from causing an image of the data to be continually present on photosensor 32. Data-sensing wavelength radiation is preferably prevented from entering wand 10 through use of a filter as the upper or viewing window 16. This filter has transmission characteristics which are complementary to the response characteristics of photosensor 32, in that it excludes data-sensing wavelength radiation from entering wand 10, but admits visible radiation for use in visually aligning wand 10.

Photosensor 32 may be selected to have a narrow band of frequencies to which it is responsive in order that it will respond to data radiation 25, but not to radiation of the wavelength utilized for visual alignment. Alternatively, photosensor 32 may have a wide bandwidth to which it is responsive and a filter 30 may be placed in data sensing optical channel 20. Where a wide bandwidth photosensor is utilized, filter 30 is selected to pass radiation of the data sensing wavelength and to exclude other radiation to which photosensor 32 would be responsive. Filter 30 preferably as a narrow passband with the sensor wavelength of the passband at the data-sensing wavelength. Photosensor 32 may preferably comprise a CCD imager array although any photosensor capable of sensing the data may be used. It is preferred that photosensor 32 be able to resolve data for optical character recognition whereby bar codes and alphanumerics can all be sensed by wand 10.

In the preferred embodiment, infrared radiation is used to sense the data and the full range of visible wavelengths are utilized for optical alignment of the wand. This has the advantage, that the optical alignment channel 12 of data sensing wand 10 appears transparent and colorless to the operator or observer 40. Infrared radiation is selected as the data sensing radiation because (1) it is Outside the visible spectrum and (2) photosensors which are responsive to infrared radiation are available and can easily and relatively inexpensively be tailored to respond to a narrow band of infrared frequencies through use of a narrow passband filter 30 in the path of the data radiation 25. Further, viewing window 16 can be made transparent to visible radiation and opaque to infrared radiation, thus achieving the exclusion of data-sensing radiation from entering the wand with visual alignment radiation, while leaving the visual alignment channel transparent and colorless.

Since infrared radiation is utilized as the data sensing radiation, source 22 in the preferred embodiment is an infrared radiation emitter. If desired, source 22 may be a light emitting diode which has a strong emission in the infrared region of the spectrum.

Figure 4:
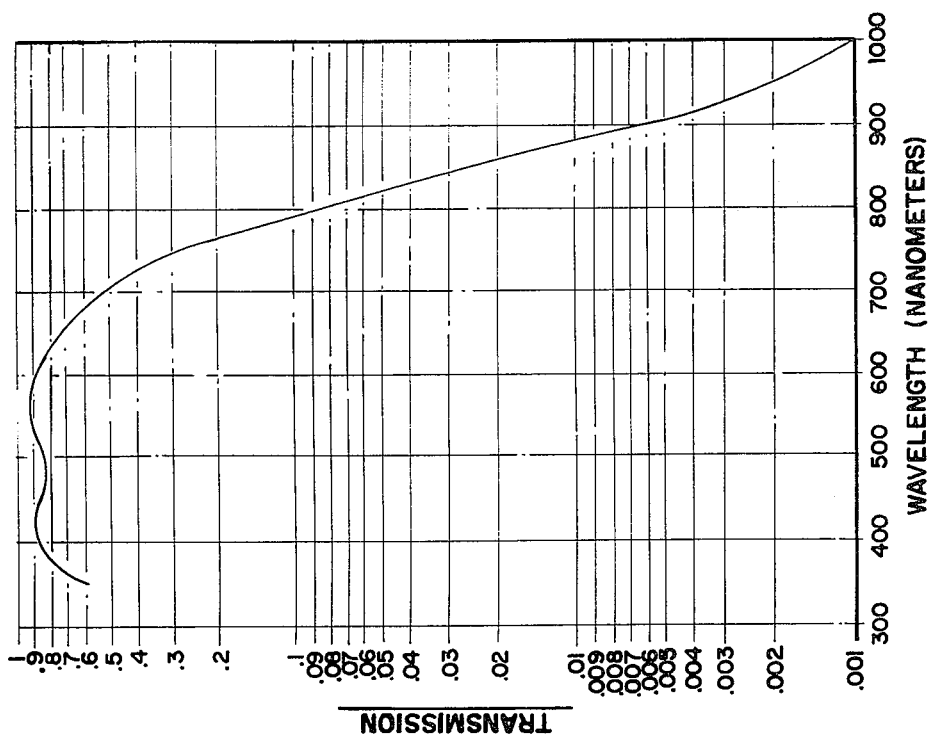
FIGS. 3 and 4 are graphs of the transmission characteristics of two filters utilized in the preferred embodiments.
Figure 3:
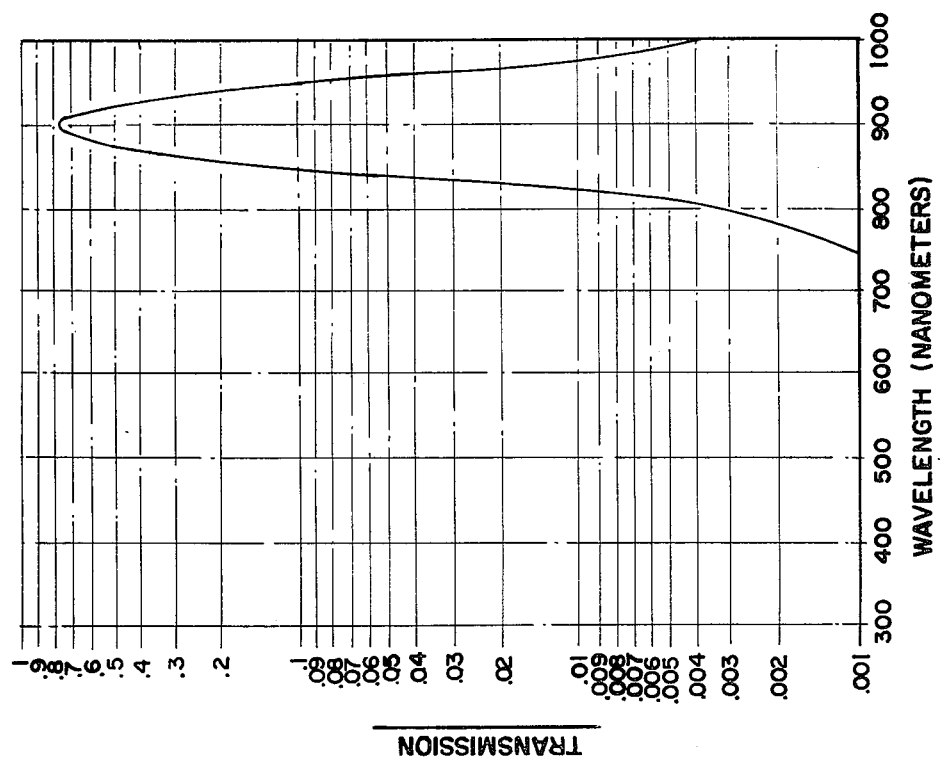

Transmission characteristics of filters 30 and 16 which may be used in the preferred embodiment are illustrated in FIGS. 3 and 4 respectively. As can be seen from FIG. 3, the filter 30 has passband centered around 900 nanometers (infrared). Thus, the visual spectrum is excluded from photosensor 32. The complementary filter of window 16 is essentially transparent to all radiation in the visual spectrum but serverely restricts the transmission of radiation having a wavelength in the vicinity of 900 nanometers. As a consequence of the exclusion of the data sensing radiation from the cavity of the wand, photosensor 32 sees an essentially black background in the absence of illumination by source 22 of the data to be collected. When it is desired to collect the data, source 22 is activated to illuminate the data and focus an image of that data on the photosensor 32. The operation of the photosensor with a "black" background and a data-sensing radiation source of known intensity is particularly important where a charge coupled device imaging array is utilized as the photosensor because such sensors are extremely sensitive and easily saturated by an image of excessive intensity.

Figure 2:
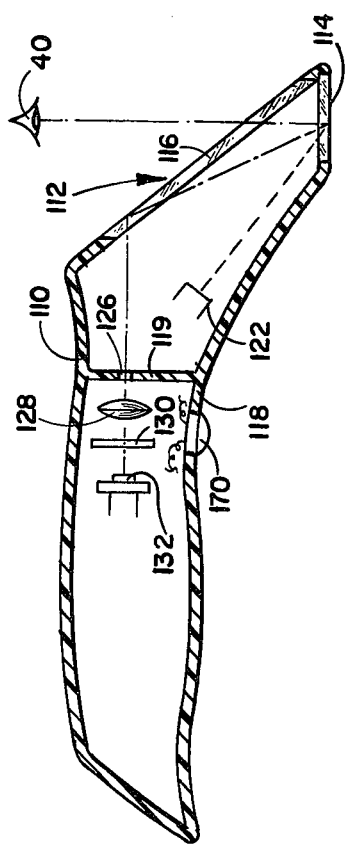
FIG. 2 is a schematic cross-sectional diagram of another embodiment of the invention.

FIG. 2 is a cross-sectional schematic of an alternative arrangement for the data sensing optical system. In this embodiment, the components of the wand are identified by reference numerals which correspond to the reference numerals utilized in FIG. 1, with the exception that 100 has been added to each reference numeral. Thus, wand 110 corresponds to wand 10, window 114 corresponds to window 14 and so forth. This embodiment varies from that of FIG. 1, in that the source 122 directly illuminates the data to be collected without reflection from a mirror and the inner side of window 116 is utilized as the mirror which reflects radiation returning from the data into the optical system, thereby eliminating the need for a mirror similar to mirror 24. Otherwise, wand 110 of FIG. 2 is similar in construction to wand 10 of FIG. 1. Wands 10 and 110 operate essentially identically.

The maximum benefits of excluding radiation of the data-sensing wavelength from entering wand 10 are achieved through use of a pulse data-sensing radiation source 22 because of the resulting minimized complexity of photosensor 32. However, benefits are achieved by excluding radiation of the data-sensing wavelength from entering the wand 10 through the visual alignment channel 12, even where the source 22 of data sensing radiation is not pulsed. Exclusion of the data-sensing wavelength of radiation from the wand and use of a source 22 of data-sensing radiation within the wand minimizes the range of image intensities to which the photosensor 32 must be designed to respond with data sensing resolution. This contributes to a reduction in the complexity required of photosensor 32 even where source 22 emits data sensing radiation continuously. Thus, the benefits of excluding data-sensing wavelength radiation from entering wand 10 through the visual alignment channel 12 are not limited to situations where the data-sensing radiation source 22 is operated only in a pulse mode.

It will be understood that if desired the photosensor optical system could be aimed directly at the data to be collected thereby eliminating the need for a mirror to reflect the data image into the optical system. Further, if desired, a data sensing wavelength which is within the visible spectrum could be utilized provided the resulting characteristics of the visual alignment channel were not considered objectionable. Other variations of the optical system which do not depart from the scope of this invention will occur to those skilled in the art. However, since the preferred embodiments are illustrative and not limitive, the scope of protection afforded this invention is defined by the appended claims.

What is claimed is:

1. A data collection wand comprising:
   data-collection optical-channel means aligned to sense data within a data sensing field of view;
   visual-alignment optical-channel means for providing an operator with a view of said data sensing field of view;
   a source of data-sensing-radiation for illuminating said data to be sensed;
   sensor means in said data-collection optical-channel means responsive to radiation of a restricted range of wavelengths for sensing radiation returned from data in said data sensing field of view; and
   filter means in said visual-alignment optical-channel means for excluding radiation in said restricted range of wavelengths from entering said data-collection optical-channel means from said visual-alignment optical-channel means.

2. The data collection wand recited in claim 1 further comprising a housing for enclosing said data-collection optical channel means and wherein:
   said data collection optical-channel means is contained within said wand housing;
   said visual-alignment optical-channel means extends through said housing; and
   said housing includes first and second window means, each at least partially included in said visual-alignment optical-channel means.

3. The data collection wand recited in claim 2 wherein:
   said first window means is common to said visual-alignment optical-channel means and to said data-collection optical-channel means;
   said first window means is designed to be placed in proximity to said data to be sensed;
   said first window means is transparent to said restricted range of wavelengths and to radiation utilized for visual alignment of said wand with said data to be sensed; and
   said second window means is transparent to said radiation utilized for visual alignment of said wand and is opaque to radiation in said restricted range of wavelengths.

4. The data collection wand recited in claim 3 wherein said restricted range of wavelengths includes infrared wavelengths and excludes visible wavelengths; and
   said radiation utilized for visual alignment includes substantially all visible wavelengths of radiation.

5. The data collection wand recited in claim 1 wherein said sensor means comprises:
   a sensor responsive to said restricted range of wavelengths and to other wavelengths of radiation; and
   second filter means for preventing radiation of wavelengths other than those within said restricted range of wavelengths from activating said sensor.

6. The data collection wand recited in claim 5 where said sensor is a charge coupled device imaging array.

7. The data collection wand recited in claim 1 further including mirror means in said data-collection optical-channel means for reflecting data sensing radiation.

8. The data collection wand recited in claim 7 wherein said mirror means reflects data-sensing-radiation emanating from said source of radiation toward said data to be sensed and reflects toward said sensor means said radiation returned from said data to be sensed.

9. The data collection wand recited in claim 1 wherein said source of radiation operates in a pulse mode.

10. The data collection wand recited in claim 9 wherein said source of radiation is activated only when data is to be sensed.

* * * * *